United States Patent Office 3,479,302
Patented Nov. 18, 1969

3,479,302
PRODUCTION OF HARDENABLE COMPOSITIONS BASED ON TRIGLYCIDYL ISOCYANURATE
Herbert Saran, Dusseldorf-Holthausen, Germany, assignor to Henkel & Cie GmbH, Dusseldorf-Holthausen, Germany, a corporation of Germany
No Drawing. Filed Nov. 16, 1967, Ser. No. 683,459
Claims priority, application Germany Nov. 18, 1966, H 61,017
Int. Cl. C08g 51/84, 51/22
U.S. Cl. 260—2
9 Claims

ABSTRACT OF THE DISCLOSURE

A process for the preparation of stable solutions of hardenable epoxide resins which comprises the steps of reacting crystalline triglycidyl isocyanurate with an epoxide resin hardener until said reaction is about 15% to 30% complete, immediately cooling the reaction mixture, dissolving said reaction mixture in an organic solvent, and recovering said stable solutions, particularly when said epoxide resin hardener is diaminodiphenyl sulfone.

The hardenable mixtures render in economical production of laminated articles possible by impregnation and molding of fiber strands.

CLAIM OF PRIORITY

The right of priority under the provisions of 35 U.S.C. 119 is hereby claimed based on the corresponding German patent application H 61,017, filed Nov. 18, 1966, on my behalf.

THE PRIOR ART

It is already known to prepare mixtures from crystalline triglycidyl isocyanurate which has a high content of epoxide oxygen, and organic compounds capable of forming polyadducts with epoxide compounds. These mixtures can be worked up as cast resins and can be hardened at elevated temperatures to synthetic resins with a high resistance to deformation by heat. However, when an attempt is made to prepare solutions from such mixtures of crystalline triglycidyl isocyanurate and epoxide resin hardeners, and to impregnate fibers with these solutions for the production of laminated molded materials, difficulties are encountered due to the poor solubility of the pure triglycidyl isocyanurate. Since, accordingly, an insufficiently heavy application of the hardenable mixture can be obtained by a one-time impregnation, this impregnation process has to be repeated. Thereby, the production of impregnated fiber mats becomes so costly, that no rational production of laminated materials by molding such "prepregs" is possible.

OBJECTS OF THE INVENTION

An object of the invention is to develop hardenable mixtures based on triglycidyl isocyanurate which are readily soluble in solvents and yielding sufficiently concentrated solutions to render an economical production of laminated materials possible by impregnation and molding of fiber strands.

Another object of the present invention is the development of a process for the preparation of stable solutions of hardenable epoxide resins based on triglycidyl isocyanurate, in organic solvents which comprises the steps of reacting a crystalline triglycidyl isocyanurate having an epoxide oxygen content of at least 14% with an epoxide resin hardener selected from the group consisting of aromatic amines having at least two —$NH_2$ groups in the molecule and organic polycarboxylic acid anhydrides, in a ratio such that from 0.6 to 1.2 epoxide reacting groups selected from the group consisting of amino hydrogen atoms and carboxylic acid anhydride groups are present for each epoxide group in said crystalline triglycidyl isocyanurate, at a temperature between about 80° C. and 130° C. until said reaction is from about 15% to 30% complete, immediately cooling the reaction mixture, dissolving said reaction mixture in an organic solvent at a temperature between 20° C. and 55° C. and recovering said stable solutions.

A further object of the present invention is the development of a process for the preparation of a stable, hardenable epoxide resin based on triglycidyl isocyanurate which comprises the steps of reacting one mol of a crystalline triglycidyl isocyanurate having an epoxide oxygen content of at least 14% with from 0.45 to 0.9 mol of diaminodiphenylsulfone at a temperature of between about 80° C. and 130° C. until said reaction is from about 15% to 30% complete, immediately cooling the reaction mixture and recovering said stable, hardenable epoxide resins.

A yet further object of the present invention is the obtention of the stable, hardenable epoxide resins produced by the above process.

These and other objects of the invention will become more apparent as the description thereof proceeds.

DESCRIPTION OF THE INVENTION

According to the invention, these objects are achieved in that crystalline triglycidyl isocyanurate having an epoxide oxygen content of at least 14% is admixed with organic compounds, which are capable of forming polyadducts with epoxide compounds in an amount necessary for the hardening process. By heating, the mixture is brought to reaction until the reaction degree amounts to 15% to 30%, preferably 18% to 25%, and the continued reaction is terminated by cooling the mixture. Thereafter, the reaction mixture is dissolved in organic solvents.

In a more particular aspect of the invention, stable solutions of hardenable epoxide resins based on triglycidyl isocyanurate in organic solvents are prepared by reacting a crystalline triglycidyl isocyanurate having an epoxide oxygen content of at least 14% with an epoxide resin hardener selected from the group consisting of aromatic amines having at least two —$NH_2$ groups in the molecule and organic polycarboxylic acid anhydrides, in a ratio such that from 0.6 to 1.2 epoxide reacting groups selected from the group consisting of amino hydrogen atoms and carboxylic acid anhydride groups are present for each epoxide group in said crystalline triglycidyl isocyanurate, at a temperature between about 80° C. and 130° C. until said reaction is from about 15% to 30% complete, immediately cooling the reaction mixture, dissolving said reaction mixture in an organic solvent at a temperature between 20° C. and 55° C. and recovering said stable solutions.

As a further aspect of the invention, it has been discovered that a reaction product of crystalline triglycidyl isocyanurate and diaminodiphenylsulfone brought to a reaction degree of from about 15% to 30% of completion is not only readily soluble in organic solvents but stable per se for periods of over six months when stored at room temperature. This stable, hardenable epoxide resin, by reacting one mol of crystalline triglycidyl isocyanurate having an epoxide oxygen content of at least 14% with from 0.45 to 0.9 mols of diaminodiphenylsulfone at a temperature of between about 80° C. and 130° C. until said reaction is from about 15% to 30% complete and immediately cooling the reaction mixture, forms a hard epoxide resin on heating to temperatures of between 100° C. and 150° C. without further treatment.

The triglycidyl isocyanurate to be used should have an epoxide oxygen content of at least 14%. The preparation of these products as such is known in the art and described in United States Patent No. 3,337,509, dated Aug. 22, 1967. The preparation can be accomplished by purification of raw reaction products, which can be obtained, for example, by reacting cyanuric acid with an excess of epichlorohydrin. In this manner, by a single or repeated recrystallization from suitable solvents as, for example, methanol, crystalline triglycidyl isocyanurate with the required epoxide content can be prepared.

As organic compounds capable of forming polyadducts with epoxide compounds, substances usually employed for the so-called high-temperature hardening of epoxide resins can be utilized. Preferably, polyvalent aromatic amines having at least two —NH$_2$ groups in the molecule are used, for example, diaminodiphenylsulfone, the isomeric phenylenediamines, benzidine, 4,4'-diaminodiphenylmethane, 4,4'-diamino-3,3'-dichloro-diphenylmethane and the like. The amount of the aromatic amines to be used shall be measured so that 0.6 to 1.2, preferably 0.8 to 1 hydrogen atoms, attached to an amino nitrogen, are allotted to each epoxide group in the molecule of the crystalline triglycidyl isocyanurate.

Another preferred group of polyadduct components comprises organic polycarboxylic acid anhydrides and particularly organic dicarboxylic acid anhydrides, for example, hexahydrophthalic acid anhydride, tetrahydrophthalic acid anhydride, phthalic acid anhydride, methylcyclohexanedicarboxylic acid anhydride, dodecenylsuccinic acid anhydride, pyromellitic acid anhydride, endomethylenetetrahydrophthalic acid anhydride, methylendomethylenetetrahydrophthalic acid anhydride and others. The amount of the carboxylic acid anhydrides to be used should be measured so that 0.6 to 1.2, preferably 0.8 to 0.9 carboxylic acid anhydride groups are allotted to each epoxide group in the molecule of the crystalline triglycidyl isocyanurate.

To effect the process of the invention, the crystalline triglycidyl isocyanature and the organic compounds, which are capable of forming polyadducts with epoxide compounds, are subjected to a partial reaction. For this purpose, for example, the mixture of the components can be heated to temperatures ranging between about 80° and 130° C., or the substance capable of forming polyadducts can be introduced into a melt of the triglycidyl isocyanurate. The duration of the reaction depends on the temperature employed and on the reactivity of the polyadduct components and, as a rule, lasts between 15 minutes and one hour. This partial reaction can be executed in the melt as well as in organic solvents. If performed in the melt, the reaction product is then dissolved in the organic solvent.

The progress of the reaction up to the desired reaction degree of 15% to 30%, preferably of 18% to 25%, can be followed when using aminic polyadduct components by titrating the epoxide oxygen content of the mixture. For this purpose a sample of the mixture is introduced into a standardized solution of pyridine hydrochloride in pyridine and the excess hydrochloric acid is back titrated. When carboxylic acid anhydrides are used as polyadduct components, the excess anhydride can be directly tritrated with a standardized sodium hydroxide solution. After the desired reaction degree has been attained, the reaction mixture is immediately cooled to about room temperature.

The obtained mixtures prove to be stable for about one month of storage when dissolved in organic solvents, without any loss of their good solubility properties. For example, acetone, methylethylketone, dioxane, ethyl acetate, butyl acetate, dimethylsulfoxide and the like are suitable as organic solvents. The mixture dissolves in the indicated solvents at temperatures ranging from 20° C. to 30° C. to about 40% to 55%. With these solutions, fibrous materials such as glass fibers or glass fibers in their natural matted condition or fiber fleece of rock wool can be impregnated and processed in the usual manner to laminated plastics after the solvent has been evaporated.

In addition, and totally unexpectedly, the mixtures obtained by utilizing diaminodiphenylsulfone as the aminic polyadduct former and reacting to a 15% to 30% reaction degree have, in addition to the excellent solubility characteristics of the other reaction mixtures of the invention, a long shelf life at room temperatures. These mixtures remain hardenable over periods of six months or longer. They are, therefore, readily adapted to impregnating processes and "prepregs" so produced can be stored until such time as the lamination process is to be effected.

Moreover, these particular reaction products prepared according to the invention can be further processed as so-called single component-casting resins. In such case, it may be advantageous to add dyes or fillers to the reaction mixture prior to, during, or after the partial reaction, as for example, quartz powder, glass powder, crushed dolomite, mica, aluminum oxide, titanium oxide, xirconium oxide or also barium sulfate.

It is a startling fact, that, by preliminary reaction of the invention process between crystalline triglycidyl isocyanurate and the compounds capable of forming polyadducts, mixtures with a good solubility are obtained after a limited preliminary reaction. This improvement in the solubility was not to be foreseen in view of the relatively poor solubility of triglycidyl isocyanurate and in view of the fact that, as a rule, in other known epoxide resins a reduction in solubility occurs with a preliminary reaction with the polyadduct component. It was, therefore, unexpected to discover that, at the execution of this preliminary reaction, starting with the mixture of triglycidyl isocyanurate and polyadduct components, in the beginning a very slight solubility exists, which, however, increases to a maximum during the course of the reaction, only to decrease thereafter.

The following examples are illustrative of the process of the invention. They are not, however, to be construed as limitative in any manner.

EXAMPLE 1

250 gm. of technical crystalline triglycidyl isocyanurate (mixture of the high- and low-melting forms; epoxide oxygen content=15.5%) were melted and 155 gm. of diaminodiphenylsulfone were added thereto. The melt was heated to 110° C. and maintained at this temperature for 30 minutes, then it was rapidly cooled. The percentage of the reaction amounted to 21% and the epoxide oxygen content of the reaction mixture was 7.6%.

From the pulverized reaction product, 50% solutions could be prepared with the following solvents: acetone, dioxane and the like.

Processing of the product of the invention

Glass webbings were impregnated with a 50% solution in acetone of the hardenable mixture, based on triglycidylisocyanurate described in the preceding, and then dried in vacuo for 10 minutes at a temperature of 100° C. The "prepregs" thus produced did not adhere to one another and could be stored over a period of 6 months.

32 layers of "prepregs" were compressed into 4 mm. thick sheets at a temperature of 165° C. and under a pressure of 165° C. and under a pressure of 15 kp./cm.$^2$ over a period of 10 minutes. From these laminates, standard sized small rods were cut and the flexural and impact strengths (DIN 53 452 and DIN 53 453) were determined; flexural strength=8,200 kp./cm.$^2$; impact strength=210 kp. cm./cm.$^2$.

EXAMPLE 2

150 gm. of technical crystalline triglycidyl isocyanurate (mixture of the high- and low-melting forms; epoxide oxygen content=15.5%) were melted and 190 gm. of tetrahydrophthalic acid anhydride were added thereto. The mixture was then heated to 120° C. and maintained at this temperature over a period of 90 minutes, then rapidly cooled. The percentage of the reaction amounted to 18% and the anhydride content of the reaction mixture was 45.7%. From this reaction product, 50% solutions could be prepared in the following solvents: acetone, dioxane.

Processing of the product of the invention

Glass webbings were impregnated with a 50% solution in acetone of the hardenable mixture based on triglycidyl isocyanurate, described above, and then dried in vacuo for 30 minutes at a temperature of 90° C. 32 layers of these "prepregs" were compressed into 4 mm. thick sheets at a temperature of 165° C. and under a pressure of 20 kp. cm./cm.$^2$ over a period of 15 minutes. From these laminates, standard sized rods were cut and the flexural and impact strengths (DIN 53 452 and DIN 53 453) were determined; flexural strength=6050 kp./cm.$^2$; impact strength=242 kp. cm./cm.$^2$.

The preceding specific embodiments are illustrative of the practice of the invention. It is to be understood, however, that other expedients known to those skilled in the art can be utilized without departing from the spirit of the invention or the scope of the appended claims.

I claim:

1. A process for the preparation of stable solutions of hardenable epoxide resins based on triglycidyl isocyanurate, in organic solvents which comprises the steps of reacting a crystalline triglycidyl isocyanurate having an epoxide oxygen content of at least 14% with an epoxide resin hardener selected from the group consisting of aromatic amines having at least two —NH$_2$ groups in the molecule and organic polycarboxylic acid anhydrides, in a ratio such that from 0.6 to 1.2 epoxide reacting groups selected from the group consisting of amino hydrogen atoms and carboxylic acid anhydride groups are present for each epoxide group in said crystalline triglycidyl isocyanurate, at a temperature between about 80° C. and 130° C. until said reaction is from about 15% to 30% complete, immediately cooling the reaction mixture, dissolving said reaction mixture in an organic solvent at a temperature between 20° C. and 55° C. and recovering said stable solutions.

2. The process of claim 1 wherein said reaction is from about 18% to 25% complete.

3. The process of claim 1 wherein said epoxide resin hardener is an aromatic amine having at least two NH$_2$ groups in the molecule.

4. The process of claim 3 wherein said aromatic amine is diaminodiphenylsulfone.

5. The process of claim 1 wherein said epoxide resin hardener is an organic polycarboxylic acid anhydride.

6. The stable solutions of hardenable epoxide resins based on triglycidyl isocyanurate produced by the process of claim 1.

7. A process for the preparation of a stable, hardenable epoxide resin based on triglycidyl isocyanurate which comprises the steps of reacting one mol of a crystalline triglycidyl isocyanurate having an epoxide oxygen content of at least 14% with from 0.45 to 0.9 mols of diaminodiphenylsulfone at a temperature of between about 80° C. and 130° C. until said reaction is from about 15% to 30% complete, immediately cooling the reaction mixture and recovering said stable, hardenable epoxide resin.

8. The stable, hardenable epoxide resin based on triglycidyl isocyanurate produced by the process of claim 7.

9. The process of claim 1 wherein said organic solvent is selected from the group consisting of acetone, methylethylketone, dioxane, ethyl acetate, butyl acetate, and dimethylsulfoxide.

References Cited

UNITED STATES PATENTS 2,809,942 10/1957 Cooke.
3,337,509 8/1967 Budnowski.

OTHER REFERENCES

Epoxy Resins, by Skeist 1960 (p. 42 relied on).

HAROLD D. ANDERSON, Primary Examiner

T. PERTILLA, Assistant Examiner

U.S. Cl. X.R.

117—124; 161—185; 260—29.1, 30.4, 30.8, 31.2, 32.8 37, 77.5